United States Patent [19]

Lu

[11] 4,004,931

[45] * Jan. 25, 1977

[54] CONSTANT VISCOSITY INKS

[75] Inventor: Chin H. Lu, Webster, N.Y.

[73] Assignee: Xerox Corporation, Stamford, Conn.

[ * ] Notice: The portion of the term of this patent subsequent to Sept. 23, 1992, has been disclaimed.

[22] Filed: May 29, 1975

[21] Appl. No.: 581,986

[52] U.S. Cl. .............................. 106/30; 252/62.1 L
[51] Int. Cl.² ......................................... C09D 11/08
[58] Field of Search ............... 106/20, 22, 30, 19; 252/62.1 L

[56] References Cited

UNITED STATES PATENTS

| | | | |
|---|---|---|---|
| 3,542,682 | 11/1970 | Mutaffis | 252/62.1 L |
| 3,907,694 | 9/1975 | Lu | 106/20 |
| 3,909,433 | 9/1975 | Gilliams et al. | 252/62.1 L |

*Primary Examiner*—Theodore Morris
*Attorney, Agent, or Firm*—James J. Ralabate; Ernest F. Chapman

[57] ABSTRACT

Ink compositions and particularly liquid developer compositions wherein the viscosity is insensitive to temperature changes, are disclosed. The developers, the viscosities of which are substantially insensitive to temperature changes, comprise by weight about 3–25 percent resin binder, about 1–3 percent of alkylated polyvinylpyrrolidone dispersing agent, the ratio of the dispersing agent to the pigment being about 5–15 percent and about 25–90 percent organic liquid carrier and/or solvent, the dispersing agent being soluble in the carrier and/or solvent.

10 Claims, No Drawings

CONSTANT VISCOSITY INKS

BACKGROUND OF THE INVENTION

This invention relates to electrostatic printing methods and compositions and more particularly to an improved ink and liquid developer composition for converting a latent electrostatic image to a visible image, the ink being characterized by constant viscosity with changing temperatures.

Processes for forming latent electrostatic images, existing as electrostatic charge patterns upon a substrate, and for subsequently converting the latent electrostatic image into a visual pattern, are well known. Generally, such electrostatic techniques have been carried out by using toners which are dry powders. However, many techniques have been developed in which the toner particles are suspended in a liquid carrier, and in electrostatic printing wherein latent electrostatic images are formed on a photoconductive surface of a recording element by uniformly charging the surface thereof, as by a corona discharge device, followed by exposure to light in the desired image pattern, such images may also be developed by liquid developers.

Liquid developer compositions for developing electrostatic images generally comprise a dispersion of pigment or toner particles in a volatile, insulating liquid of high dielectric strength and high volume resistivity, generally in excess of $10^9$ ohm-cm. The dispersed particles may carry either a positive charge or a negative electrical charge, depending upon their chemical composition, the non-conductivity and the high dielectric strength of the volatile liquid in the liquid developing composition preserves the electrostatic image and permits the deposition of the dispersed toner particles to form a visible image. Generally these liquid developer compositions have been commercially available inks comprising water or oil bases. Other suitable insulating liquids have included aromatic hydrocarbons, such as, benzene, toluene, and xylene; aliphatic hydrocarbons, such as, hexane, cyclohexane, and heptane; freons and halogenated hydrocarbons; and silicone oils.

Liquid toners or developers are described in U.S. Pat. No. 2,907,674, U.S. Pat. No. 2,899,335, U.S. Pat. No. 2,890,911, U.S. Pat. No. 3,135,095, U.S. Pat. No. 3,115,546, and U.S. Pat. No. 3,535,244.

In one type of liquid development the suspended toner particles are electrostatically charged and develop the latent image by migration of the particles to the image surface under influence of the image charge. This is known as electrophoretic development and utilizes the developers having insulating liquids of relatively high volume resistivity.

In another type of electrostatic image development disclosed by Gundlach in U.S. Pat. No. 3,084,043 and U.S. Pat. No. 3,551,146, liquid developers having relatively low viscosity, low volatility, contrast in color in the usual case to the surface on which it will remain, and relatively high electrical conductivity (relatively low volume resistivity), are disclosed for converting the electrostatic latent image to a visible image. According to this method liquid developer from a reservoir is deposited on a gravure roller and fills the depression in the roller surface. Excess developer is removed from the lands between depressions, and as a receiving surface charged in image configuration passes against the gravure roller, the liquid developer is attracted from the depressions in image configuration by the charge. This method of development is referred to as polar liquid development. Typical liquid developers found useful in this mode of development are described by Amidon et al in U.S. Pat. No. 3,806,354 where typical developers comprise by weight from about 1 to about 20 percent dispersant, from about 15 to about 60 percent colorant and from about 40 to about 85 percent total vehicle. Although the liquid developers of Amidon et al are excellent for electrostatographic development of latent images, they encompass inks the viscosities of which have substantial variation with temperature changes. Liquid developer compositions comprising carrier liquid, colorant and polymeric material capable of imparting negative-working characteristics to the toner are described by Mutaffis in U.S. Pat. No. 3,542,681. However, there are no critical limitations in Mutaffis which would be indicative of liquid developer compositions having substantially constant viscosities when changes in temperature occur.

OBJECTS OF THE INVENTION

Accordingly, it is an object of the present invention to provide an ink or liquid developer composition for development of latent electrostatic images wherein the viscosity of the ink remains relatively constant with variations in temperature.

It is an object of the present invention to provide an ink or liquid developer composition having critical proportions of ingredients which result in a liquid composition having relatively constant viscosities during changes in temperature.

Another object of the present invention is to provide a process wherein the improved ink or liquid developer compositions of the present invention are applied in image configuration to a surface having a latent electrostatic image thereon.

Still further objects and advantages of the novel ink or liquid developer composition and method of the present invention will become apparent from the following more detailed description thereof.

SUMMARY OF THE INVENTION

We have discovered that the above objects may be carried out by providing an ink comprising by weight about 3–25 percent coloring agent, about 25–90 percent organic liquid carrier, about 3–35 percent organic resin binder selected from the group consisting of rosin esters, ester gums and mixtures thereof and about 1–3 percent alkylated polyvinylpyrrolidone dispersing agent, the ratio of the dispersing agent to the coloring agent being about 5–15 percent. It is critical that the designated proportions be used in the composition, that the dispersing agent be rosin esters and/or ester gums and that the dispersing agent be alkylated polyvinylpyrrolidone. When these critical proportions are used and when the designated ingredients are used, the compositions have a surprising tendency to maintain constant viscosities when temperature changes.

The ink or liquid developer compositions having constant viscosities may be used for developing latent electrostatic images on a substrate comprising contacting the surface of the substrate containing the latent electrostatic image with the composition.

As used herein coloring agent refers to pigments, dyes, and mixtures thereof. Constant viscosity is described empirically herein as a variation of less than about 20 percent when the temperature is increased from about 15° C to about 35° C.

More specifically, constant viscosity means a viscosity ratio of less than about 2 when the viscosity at one temperature is compared with the ratio at a higher temperature. For example, when the ratio of $\eta_{15}$ c:$\eta_{35}$ c is less than about 2, the viscosity is deemed constant in accordance with this invention. An ideal ratio of the viscosities is about 1.

DESCRIPTION OF THE PREFERRED EMBODIMENTS

In the compositions of the present invention, coloring agent, which is the toner, pigment and/or dye, is suspended and/or dissolved in liquid carrier, and the specified class of organic resin binders are dissolved in the organic liquid carrier. Alkylated polyvinylpyrrolidone dispersing agent is dissolved in the carrier. When the ink or electrostatic printing composition comprises 3–25 percent coloring agent, 25–90 percent organic liquid carrier 5–35 percent of the specified organic resin binder and 1 to 3 percent alkylated polyvinylpyrrolidone dispersing agent, the viscosity of the inks are relatively low and vary from about 200–1,500 centipoises at 25° C, and the viscosity of the ink remains constant at varying temperature, when the ratio of the dispersing agent to the coloring agent is about 5–15 percent. The specified organic resin binders are used to improve rub resistance.

The liquid organic carriers which may be used in the composition of the present invention, are preferably inert, non-volatile, and high boiling and must comprise about 25–90 percent (by weight) of the composition. The organic carrier must dissolve the organic resins. Pigment or toner particles may be suspended therein. However, certain dyes may be used alone or in conjunction with the pigment dispersed in the carrier, and such dyes may be soluble in the organic carrier. The organic carrier is preferably a non-volatile liquid in order to prevent evaporation from the composition while standing in an idle machine, or while it is being utilized in a printing or copying process, or while it is deposited upon a substrate. Thus, such non-volatile organic carriers which have been found useful in the present invention, comprise those organic liquids which have boiling points of about 200° C. or higher. Examples of such solvents are alcohols, esters, ethers and the hydrocarbon oils known as mineral oil, and certain aromatic compounds having a boiling point in excess of 200° C. Representative of suitable aromatic solvents which may be used as the carrier in the present invention, are such materials as tetrahydronaphthalene, heptadecylbenzene and 1-chloronaphthalene. Examples of alcohols (including glycols) which may be used in the composition are tridecanol, diethylene glycol and triethylene glycol. Examples of esters which are useful as carries or solvents herein are triethylene glycol diacetate and glyceryl triacetate, and examples of glycol ethers which may be used as the solvent are butyl triethylene glycol and hexyl diethylene glycol. Examples of the preferred hydrocarbon oils or mineral oils which may be used in accordance with the present invention, include Magie Oil 520 having a boiling range of 270° C – 296° C and Magie Oil 625 having a boiling range of 293° C – 362° C, both materials supplied under these tradenames by Magie Bros. Oil Company. While the boiling point is not critical, it is preferred to make use of a solvent component having a boiling point in excess of about 200° C. These solvents when used with the other components of the composition, result in a composition having a relatively high electrical resistivity (in excess of about $10^9$ ohm-cm), low dielectric constant, and the desired non-tackifying characteristics for the specified organic resins. Compositions having an electrical resistivity in excess of about $10^9$ ohm-cm are deemed to be non-conductive.

The dissolved organic resin binder comprises about 3–25 percent (by weight) of the composition, and preferably no less than about 5 percent (by weight) the resin is used in a composition for liquid developers for developing latent electrostatic images. Generally, one part of resin is used for each part of coloring agent utilized in the composition. About one part resin for each part of coloring agent is recommended to obtain proper binding of the pigment when the composition is applied to a substrate, however, suitable liquid developers and inks are obtained in accordance with the present invention when more than one part of resin is used for every part of coloring agent. Thus, the lower limit or resin used in the composition is, in essence, controlled by the amount of pigment or coloring agent required to provide the proper density when the composition is applied to a substrate such as paper.

In the present invention, the organic resin binder must be one or a mixture of rosin esters or ester gums. Furthermore, these ingredients must be soluble in the particular carrier used in the composition. The ester gums are semisynthetic resins produced by esterification of natural resins (especially rosin) with polyhydric alcohols (principally glycerol but also pentaerythritol). A particular example of these rosin esters or ester gums is the glycerol ester of hydrogenated rosin. One commercial product is provided by Hercules, Inc., under the trade designation of Staybelite Ester 5 and is prepared from glycerine and hydrogenated rosin.

The coloring agents or toner particles of the developer composition include a wide variety of solid particles as described in U.S. Pat. No. 2,297,691, including talcum powder, aluminum bronze, carbon dust, and the like, the principle requirement being that the particles be electrically attractable. Preferred coloring agents include such powders as nigrosines, or carbonaceous materials, such as carbon black, lamp black, bone black or the like. The coloring agent may be in the form of pigment particles formulated of a suitable dyestuff or carbon black embodied in a resinous carrier. Dyes may also be used as coloring agent in conjunction with pigments. The dyes are generally soluble in the organic carrier and are used to supplement the color in the composition which is attributable to the pigment dispersed therein. One skilled in the art can select a suitable coloring agent which may include a dispersed pigment or combination of pigments or a pigment or combination of pigments in conjunction with one or more dyes. The coloring agents may be dispersed in the organic liquids, dissolved in the organic liquid carrier, or distributed in the carrier in any other suitable manner or a combination thereof. About 3–25 percent (by weight) coloring agent may be utilized in the composition of the present invention, and as described above, one part of coloring agent is generally used for each part of resin but the ratio of dispersing agent to coloring agent must be about 5–15 percent. It is generally perferred that at least 5 percent (by weight) of the composition be pigment in order to provide sufficient density of the coloring agent when it is deposited upon the substrate. One skilled in the art can determine the amount of coloring agent required for any given composition by determining the density of the developed image upon a substrate.

Other additives and agents may be used in the composition of the present invention as long as such additives do not adversely affect the viscosity, conductivity, print density, and rub resistance of the composition after it has been applied to a substrate.

Another critical ingredient in the composition is the dispersing agent and about 1 percent to about 3 percent of the dispersing agent must be used in the composition of the present invention. The dispersing agent must be soluble in the liquid carrier. Generally the dispersing agent improves the shelf-like of the composition by increasing the ability of the pigment particles and/or the dispersed resin to remain dispersed in the organic carrier upon standing. The dispersing agents which are operable in the constant viscosity compositions of the present invention are the alkylated polyvinylpyrrolidones.

Another additive which may be used in the composition of the present invention without adversely effecting the abovementioned properties is a plasticizer. Plasticizers are used to adjust the power of the solvent to disperse the resin. However, too high a solvent power will dissolve the resin, and accordingly, too much plasticizer will completely or partially dissolve the organic resin and thereby produce an adverse effect upon the resulting composition. Accordingly, one skilled in the art can adjust the amount of plasticizer which may be used in the composition, however, the plasticizer when it is present, generally is present in no greater quantity than about 50 percent of the organic carrier in the composition. The plasticizer is completely miscible with the organic carrier. Examples of plasticizers which may be used in the composition of the present invention are: di-(2-ethyl hexyl) adipate, di-isooctyl adipate, di-isodecyl adipate, di-(2-ethyl hexyl) azelate, triethylene glycol di-2-ethylhexoate, triethylene glycol di-2-ethylbutyrate, triethylene glycol dicaprylate, triethylene glycol dipelargonate, dodecyl alcohol, and di-isooctyl sebacate.

Other additives which may be used in the composition of the present invention include up to about 10 percent (by weight) of an agent to accelerate the drying of the composition upon the substrate. An example of such a drying acceleration agent is a cyclized rubber having a weight average molecular weight of about 13,000, said cyclized rubber being the reaction product of natural rubber and sulfuric acid. The amount of drying acceleration agent utilized in the composition can be determined by one skilled in the art and may be an amount sufficient to accelerate the drying of the resin in the present composition without adversely effecting the properties including constant viscosity of the composition under changing temperatures.

The inks of developer compositions of the present invention are characterized by relatively low, but constant viscosities of about 200 to about 1500 centipoises at 25° C and have excellent pot life. When used as liquid developers and deposited upon a paper substrate, the inks are characterized by excellent rub resistance. The constant viscosity characteristics under changing temperatures is a substantial improvement over the prior art classes of inks wherein there is an inability of the inks to retain their viscosity under normal variations in temperature. Prior art inks may be suitable when placed in a copying device, but when heated to operating temperatures, then viscosity becomes too markedly changed for optimal functioning of the copier. Inks of the present invention have overcome this deficiency of the prior art inks.

The inks or liquid developers of the present invention have excellent characterstics for application to latent electrostatic images for the development thereof in electrostatographic processes. The relatively high electrical resistivity of the inks, the fine particle sizes of the dispersed particles and the relatively low, but constant viscosity of the composition all contribute to the ease with which these compositions are used. Furthermore, the ingredients of the compositions do not separate during migration to the imaged surface. The ink or liquid developer compositions of the present invention do not require any heating or additional drying step to fix the composition to the surface to which it is applied. A latent electrostatic image on a substrate may be developed by positioning close, but spaced from the electrostatic latent image on the substrate, a constant viscosity composition having by weight about 3–25 percent coloring, about 25–90 percent organic liquid carrier, about 5–35 percent organic resin binder selected from the group consisting of rosin esters, ester gums or mixtures thereof, about 1–3 percent alkylated polyvinylpyrrolidones dispersing agent; providing flow aiding elements in physical contact between said developer and said substrate; and applying a bias to said developer whereby the developer moves along said flow aiding elements to said substrate thereby developing the electrostatic latent image. The developer may be optionally transferred in configuration to a receiving substrate. The constant viscosity developer or ink becomes fixed to said substrate with little or no evaporation in the absence of heat. The developed image fixed to said substrate has excellent rub resistance.

Although the constant viscosity ink composition of the present invention has excellent properties for developing electrostatic latent images, the ink composition may also be used for various standard printing processes. Furthermore, when the constant viscosity is such that higher viscosities are realized, for example, in excess of 1000 centipoises, the ink composition may be used for such types of printing as offset (lithographic) and the like. Such compositions for lithographic purposes would have extremely high viscosities and would not be suitable for electrostatic printing purposes, however, such compositions have the proper consistency for use in offset printing.

This invention can be better understood by reference to the following examples, wherein all ingredients are listed by weight percent (dispersing agent to pigment ratio excepted) unless otherwise indicated. Viscosities were determined on a Brookfield Viscometer and values are given in centipoises. Measurements were made at 12 RPM, 30 RPM and 60 RPM and various temperatures as designated. A No. 2 spindle was used for the tests except in Composition 12 where a No. 3 spindle was used.

EXAMPLE I

An ink composition (Composition No. 1) having 37.5 percent carbon black pigment resin (Microlith CT Black, a pigmented resin of about ⅓ pigment and ⅔ glycol ester of rosin binder supplied by Ciba Chemical Company), 1.7 percent alkylated polyvinylpyrrolidone dispersing agent (dispersant) having a molecular weight of 8,000 (supplied by GAF Corporation under the tradename, Ganex V 220), 30.4 percent hydrocarbon solvent having a boiling point of 335°–356° C (supplied by Magie Bros. Oil Co. under the tradename, Magie Oil 625) and 30.4 percent tetrahydronaphthalene, a solvent, was compounded by ball milling techniques. The ratio of dispersing agent to pigment was 0.136, or alternatively expressed, the amount of dispersant used was 13.6 percent of the amount of pigment used.

A second ink composition (Composition No. 2) was prepared as indicated above using 37.5 percent of the same pigment resin, 1.5 percent of the same alkylated polyvinylpyrrolidone, 20.3 percent of the same hydrocarbon solvent and 40.7 percent tetrahydronaphthalene. The amount of dispersant used was 12.0 percent of the amount of pigment used.

A third ink composition (Composition No. 3) was prepared as indicated above using 37.5 percent of the same pigment resin, 3.0 percent of the same alkylated polyvinylpyrrolidone, 29.8 percent of the same hydrocarbon solvent and 29.7 percent tetrahydronaphthalene. The amount of dispersant used was 24.0 percent of the amount of pigment used.

Table I below shows a comparison of the viscosities of the three compositions described in Example I. The viscosities (in centipoises) are compared at temperatures of 15° C, 25° C and 35° C. The ratio of viscosity at 15° C to the viscosity at 35° C at 30 RPM is shown.

EXAMPLE II

An ink composition (Composition No. 4) having 15 percent of a furnace carbon black pigment (Mogul L supplied by Cabot Corporation), 2.0 percent alkylated polyvinylpyrrolidone having a molecular weight of 7,300 (supplied by GAF Corporation under the tradename Ganex V 216), 15 percent of the glycerol ester of hydrogenated rosin binder (supplied by Hercules, Inc. under the tradename Staybelite Ester 5), and 68 percent of hydrocarbon solvent having a boiling point of 335°–356° C and supplied by Magie Bros. Oil Co., under the trade designation Magie Oil 625, was prepared. The amount of dispersant used was 13.3 percent of the amount of pigment used.

A second ink composition (Composition No. 5) was prepared using identical ingredients in the amounts set forth as follows:

| | |
|---|---|
| Carbon black | 15 percent |
| alkylated polyvinylpyrrolidone | 3 percent |
| binder | 20 percent |
| hydrocarbon solvent | 62 percent |

The amount of dispersant used was 20.0 percent of the amount of pigment used.

Table II below shows a comparison of the viscosities of the two compositions described in Example II. The viscosities (in centipoises) are compared as in Table I above.

TABLE I

| COMPOSITION | PERCENT OF DISPERSANT TO PIGMENT | TEMP °C | VISCOSITY (cp.) 12 RPM | 30 RPM | 60 RPM | $\eta 15° C/\eta 35° C$ (at 30 RPM) |
|---|---|---|---|---|---|---|
| 1 | 13.6 | 15 | 450 | 310 | 250 | |
| | | 25 | 520 | 320 | 230 | 1.00 |
| | | 35 | 540 | 310 | 220 | |
| 2 | 12.0 | 15 | 550 | 340 | 220 | |
| | | 25 | 600 | 310 | 200 | 0.97 |
| | | 35 | 640 | 350 | 230 | |
| 3 | 24.0 | 15 | 140 | 130 | 120 | |
| | | 25 | 110 | 105 | 98 | 2.32 |
| | | 35 | 64 | 56 | 54 | |

TABLE II

| COMPOSITION | PERCENT OF DISPERSANT TO PIGMENT | TEMP °C | VISCOSITY (cp.) 12 RPM | 30 RPM | 60 RPM | $\eta 15° C/\eta 35° C$ (at 30 RPM) |
|---|---|---|---|---|---|---|
| 4 | 13.3 | 15 | 780 | 490 | 340 | |
| | | 25 | 810 | 450 | 310 | 1.04 |
| | | 35 | 900 | 470 | 310 | |
| 5 | 20.0 | 16 | 210 | 200 | 200 | |
| | | 25 | 130 | 120 | 120 | 2.50 |
| | | 36 | 80 | 80 | 80 | |

An examination of Table I indicates that Compositions 1 and 2 wherein the amount of the dispersant is 13.6 percent and 12.0 percent of the amount of pigment respectively, show little or no change in viscosity when the temperature of the ink composition increases from 15° C to 35° C. The viscosity ratios at the measured temperatures at 1.00 or very near 1.00. Composition 3 wherein the amount of dispersant is 24 percent of the amount of pigment present in the ink, shows a very significant decrease in viscosity when the temperature is increased from 15° C to 35° C.

An examination of Table II indicates that viscosity changes in the composition are negligible at varying temperatures when the amount of dispersant of the present invention is 13.3 percent of the amount of pigment present. When the ratio of dispersant to pigment was increased to 20.0 percent, an increase in temperature from 16° C to 36° C resulted in a very significant change in viscosity.

EXAMPLE III

Ink compositions set forth below were prepared in accordance with Example I. Unless otherwise specified ingredients identical to those of Example I were used: (COMPOSITION 6)

| (COMPOSITION 6) | |
|---|---|
| Pigment (including binder) | 37.5 percent |
| Dispersing Agent | 1.5 percent |
| Mineral Oil Solvent | 61.0 percent |

The mineral oil solvent used in this example was a high boiling non-volatile hydrocarbon oil. The ratio of dispersing agent to pigment was 0.12, or alternatively expressed, the amount of dispersing agent used was 12.0 percent of the amount of pigment used.

| (COMPOSITION 7) | |
|---|---|
| Pigment (including binder) | 37.5 percent |
| Dispersing Agent | 3.0 percent |
| Mineral Oil solvent | 59.5 percent |

The ratio of dispersing agent to pigment was 0.24, or alternatively expressed, the amount of dispersing agent used was 24.0 percent of the amount of pigment used.

| (COMPOSITION 8) | |
|---|---|
| Pigment (including binder) | 31.1 percent |
| Dispersing Agent | 9.2 percent |
| Mineral Oil Solvent | 59.7 percent |

The ratio of dispersing agent to pigment was 0.89, or alternatively expressed, the amount of dispersing agent used was 89.0 percent of the amount of pigment used.

Table III below shows a comparison of the viscosities of the compositions described in Example III. The viscosities (in centipoises) are compared as in Table I above.

ment present. When the amount of dispersant was increased to 24.0 percent and 89.0 percent of the amount of pigment, an increase in temperature from 25° C to 50° C and from 15° C to 35° C respectively, resulted in a very significant change in viscosity.

EXAMPLE IV

Ink compositions set forth below prepared as in Example I. Unless otherwise specified ingredients identical to those of Example I were used. A plasticizer, triethylene glycol dicaprylate, was used in conjunction with the solvent.

| (COMPOSITION 9) | |
|---|---|
| Pigment (including binder) | 37.5 percent |
| Dispersing Agent | 1.5 percent |
| Plasticizer | 10.3 percent |
| Tetralin (solvent) | 50.7 percent |

The amount of dispersing agent (dispersant) used was 12.0 percent of the amount of pigment used.

| (COMPOSITION 10) | |
|---|---|
| Pigment (including binder) | 37.5 percent |
| Dispersing Agent | 1.5 percent |
| Plasticizer | 20.3 percent |
| Tetralin (solvent) | 40.7 percent |

The amount of dispersant used was 12.0 percent of the amount of pigment used.

Table IV below shows a comparison of the viscosities of the two compositions described in Example IV. The viscosities (in centipoises) are compared as in Table I above.

TABLE IV

| COMPOSITION | PERCENT OF DISPERSANT TO PIGMENT | TEMP °C | VISCOSITY (cp.) 12 RPM | 30 RPM | 60 RPM | $\eta 15° C/\eta 35° C$ (at 30 RPM) |
|---|---|---|---|---|---|---|
| 9 | 12.0 | 15 | 620 | 370 | 260 | |
|  |  | 25 | 650 | 380 | 260 | 1.05 |
|  |  | 35 | 640 | 350 | 230 | |
| 10 | 12.0 | 15 | 780 | 450 | 310 | |
|  |  | 25 | 790 | 430 | 290 | 1.12 |
|  |  | 35 | 770 | 400 | 240 | |

The data in Table IV indicates that viscosity changes in the composition are negligible at varying temperatures when the amount of specified dispersing agent in the composition is 12.0 percent of the amount pigment present, even when plasticizer is utilized in the composition.

TABLE III

| COMPOSITION | PERCENT OF DISPERSANT OF PIGMENT | TEMP °C | VISCOSITY (cp.) 12 RPM | 30 RPM | 60 RPM | $\eta 25° C/\eta 50° C$ (at 30 RPM) |
|---|---|---|---|---|---|---|
| 6 | 12.0 | 25 | 850 | 720 | 670 | |
|  |  | 36 | 1240 | 740 | 580 | 0.99 |
|  |  | 50 | 1360 | 730 | 550 | |
| 7 | 24.0 | 25 | 300 | 290 | 290 | |
|  |  | 36 | 160 | 160 | 150 | 3.62 |
|  |  | 50 | 90 | 80 | 80 | |
| 8 | 89.0 | 15 | 470 | 490 | 470 | |
|  |  | 25 | 250 | 240 | 220 | 3.76* |
|  |  | 35 | 140 | 130 | 140 | |

*represents $\eta 25° C/\eta 35° C$

An examination of Table III indicates that viscosity changes in the composition are negligible at varying temperatures when the amount of dispersing agent in the composition is 12.0 percent of the amount of pig-

EXAMPLE V

Ink compositions set forth below were prepared as in Example I. Unless otherwise specified ingredients identical to those of Example I were used:

| (COMPOSITION 11) | |
|---|---|
| Pigment (binder included) | 37.5 percent |
| Dispersing Agent | 1.7 percent |
| Tetralin (solvent) | 60.8 percent |

The amount of dispersing agent used was 13.6 percent of the amount of pigment used.

| (COMPOSITION 12) | |
|---|---|
| Pigment (binder included) | 37.5 percent |
| Dispersing Agent | 0.75 percent |
| Light Mineral Oil (as in Example III) | 61.75 percent |

The amount of dispersing agent used was 6.0 percent of the amount of pigment used.

Table V below shows the viscosities of the two compositions of Example V. The viscosities (in centipoises) are compared as in Table I above.

TABLE V

| COMPOSITION | PERCENT OF DISPERSANT TO PIGMENT | TEMP °C | VISCOSITY (cp.) 12 RPM | 30 RPM | 60 RPM | $\eta°C/\eta°C$ (at 30 RPM) |
|---|---|---|---|---|---|---|
| 11 | 13.6 | 15 | 540 | 310 | 210 | |
| | | 25 | 530 | 280 | 190 | .94* |
| | | 35 | 610 | 330 | 210 | |
| 12 | 6.0 | 24.9 | 2100 | 1280 | 968 | |
| | | 38.3 | 1790 | 976 | 710 | 1.45** |
| | | 49.3 | 1590 | 880 | 606 | |

*represents $\eta 15°C/\eta 35°C$
**represents $\eta 24.9°C/\eta 49.3°C$

The data obtained from Composition 11 indicates that viscosity changes in the composition are minor at varying temperatures when the amount of specified dispersing agent in the composition is 13.6 percent of the amount of pigment present, however, when the amount of the specified dispersing agent in the composition reaches as low as 6.0 percent of the amount of pigment, viscosity changes approach significant levels at varying temperatures.

EXAMPLE VI

An ink composition having the ingredients as set forth below and as prepared in Example I, Composition No. 1, was prepared by sand milling and had a dispersant : pigment ratio of 12.0 percent.

| Pigment (binder included) | 37.5 percent |
|---|---|
| Dispersing Agent | 1.5 percent |
| Hydrocarbon Solvent I | 36.0 percent |
| Hydrocarbon Solvent II | 25.0 percent |

Solvent I was Magie Oil 543 having a boiling point of 246°–278° C and solvent II was Magie Oil 625 having a boiling point of 335°–356° C, both supplied by Magie Bros. Oil Co.

The viscosity-temperature profile is shown in Table VI below:

TABLE VI

| Temp. °C | VISCOSITY (cp.) 12 RPM | 30 RPM | 60 RPM | $\eta 15°C/\eta 35°C$ (30 RPM) |
|---|---|---|---|---|
| 15 | 450 | 300 | 260 | |
| 25 | 460 | 300 | 230 | 1.23 |
| 35 | 390 | 240 | 180 | |

The data indicates that by sand milling techniques used in preparing the composition, viscosity changes in the composition are minor at varying temperatures when the ratio of the specified dispersing agent to pigment is 0.12 (or 12 percent).

EXAMPLE VII

The composition of Example I (Composition No. 1) was prepared by a sand milling technique. The viscosity-temperature profile for the composition so prepared is shown in Table VII below. This dispersant : pigment ratio was 0.136 or 13.6 percent.

TABLE VII

| Temp. °C | VISCOSITY (cp.) 12 RPM | 30 RPM | 60 RPM | $\eta 15°C/\eta 35°C$ (30 RPM) |
|---|---|---|---|---|
| 15 | 250 | 200 | 170 | |
| 25 | 240 | 170 | 150 | 1.25 |
| 35 | 250 | 160 | 120 | |

The viscosity for the repeated run was lower, but it had the same viscosity-temperature effect as Composition No. 1 in Table I above, even though a different art technique was used in compounding the compositions.

The constant viscosity ink compositions prepared in the above examples had characteristics suitable for use as liquid developers in the development of latent electrostatic images. The viscosity tests applied in each case demonstrated that the constant viscosity ink compositions are suitable for application to latent electrostatic images which have been formed on the photoconductive surface of a recording element by uniformly charging the surface thereof, as by a corona discharge device, followed by exposure to light in the desired image pattern. The images are then developed by the application of the nonconductive liquid developer to the imaged surface for development in image configuration.

In accordance with the stated objects, there has been demonstrated ink or liquid developer compositions wherein the viscosity of the ink remains constant with variations in temperature. These compositions must comprise critical proportions of the specified ingredients, the ratio of dispersant to pigment being critical and in the range of about 0.05 to about 0.15 (alternatively expressed as about 5–15 percent). The dispersing agent must be of the class designated as alkylated polyvinylpyrrolidones and the organic resin binders being one species of rosin esters or ester gums or mixtures thereof.

It should be understood that the foregoing description is for the purpose of illustration only and that the invention includes all modifications falling within the scope of the appended claims.

What is claimed is:

1. A constant viscosity liquid developer composition comprising by weight about 3–35 percent coloring agent, about 25–90 percent organic liquid solvent, about 5–35 percent of a rosin ester binder, about 1–3 percent alkylated polyvinylpyrrolidone dispersing agent soluble in the organic liquid, the ratio of the dispersing agent to the coloring agent being about 5–15 percent whereby the viscosity varies less than about 20 percent when the temperature is increased from about 15° C to about 35° C.

2. The composition of claim 1 wherein the organic carrier comprises up to about 50 percent plasticizer.

3. The composition of claim 1 wherein the coloring agent is carbon black.

4. The composition of claim 1 comprising up to about 10 weight percent of an agent to accelerate drying time.

5. The composition of claim 4 wherein the drying acceleration agent is a cyclized rubber having a weight average molecular weight of about 13,000, said cyclized rubber being the reaction product of natural rubber and sulfuric acid.

6. A process for developing latent electrostatic images on a substrate comprising contacting the surface of the substrate containing the latent electrostatic image with a constant viscosity liquid developer composition containing about 3–25 weight percent coloring agent, about 25–90 weight percent organic liquid solvent, about 5–35 weight percent of a rosin ester binder, about 1–3 weight percent alkylated polyvinylpyrrolidone dispersing agent soluble in the organic liquid, the ratio of the dispersing agent to the coloring agent being about 5–15 weight percent, the viscosity of said composition varying less than about 20 percent when the temperature is increased from about 15° C to about 35° C.

7. The process of claim 6 wherein the organic carrier comprises up to about 50 percent plasticizer.

8. The process of claim 6 wherein the composition further comprises an amount of drying acceleration agent sufficient to accelerate the drying of the composition.

9. The process of claim 8 wherein the drying acceleration agent is a cyclized rubber having a weight average molecular weight of about 13,000, said cyclized rubber being the reaction product of natural rubber and sulfuric acid.

10. The process of claim 6 wherein the coloring agent is carbon black.

* * * * *